United States Patent [19]

Paulig

[11] Patent Number: 5,381,969

[45] Date of Patent: Jan. 17, 1995

[54] ARRANGEMENT AND METHOD IN CONNECTION WITH THE RETAIL SALES OF BREWABLE PRODUCTS

[75] Inventor: Robert Paulig, Helsinki, Finland

[73] Assignee: Oy Gilvaria AB/Robert's Coffee Co., Helsinki, Finland

[21] Appl. No.: 65,271

[22] Filed: May 21, 1993

[30] Foreign Application Priority Data

May 27, 1992 [FI] Finland ................ 922445

[51] Int. Cl.⁶ ............................................. A47J 42/00
[52] U.S. Cl. ........................................ 241/36; 241/100
[58] Field of Search ............... 241/33, 34, 36, 100, 241/6

[56] References Cited

U.S. PATENT DOCUMENTS 4,344,579  8/1982  Morita et al. ............... 241/36
4,789,106  12/1989  Weber ........................... 241/100
4,971,259  11/1990  Nidiffer ....................... 241/34

FOREIGN PATENT DOCUMENTS 397977  8/1965  Switzerland .
1634  of 1906  United Kingdom ............... 241/100

Primary Examiner—Douglas D. Watts
Attorney, Agent, or Firm—Burns, Doane, Swecker & Mathis

[57] ABSTRACT

An arrangement in connection with the retail sales of coffee or similar, comprising a grinder and a supply chamber for conveying coffee beans or similar to the grinder. To enable versatile and environmentally friendly distribution, the arrangement comprises at least one storage chamber for coffee beans or similar, means for conveying coffee beans or similar from the storage chamber to a supply chamber, and equipment for controlling the grinder to grind a predetermined quantity of coffee or similar.

17 Claims, 2 Drawing Sheets

ARRANGEMENT AND METHOD IN CONNECTION WITH THE RETAIL SALES OF BREWABLE PRODUCTS

BACKGROUND OF THE INVENTION

The present invention relates to an arrangement in connection with the retail sales of brewable products, such as coffee or similar products, comprising a grinder and a supply chamber for conveying coffee beans or similar to the grinder.

Formerly in the 1950s coffee was most often purchased as beans in packages of one quarter of a kilogram, and the shopkeeper ground the beans at the time of selling with a grinder provided in the shop. Such a retail method is, however, no longer used, but currently practically the only possibility is vacuum-packed light-roast coffee.

The packaging solution used today is, however, not the best possible from the environmental point of view, since as a result for instance in Finland annually nearly 4000 tons of waste is produced, and 1500 tons of this waste is laminate that is difficult to destroy. It is very likely that sooner or later attention will be paid to this drawback. Another drawback to the prior art technology is its limitedness, i.e. the fact that in practice only said light-roast coffee is available. A further disadvantage is that the coffee presently available no longer meets the requirements of the customer in every case, as customers are today quite often accustomed to fresh coffee which has a completely different taste and aroma from conventional vacuum-packed coffee.

SUMMARY

It is an object of the present invention to provide an arrangement wherewith the drawbacks of the previously used technology can be eliminated. This has been achieved with the arrangement of the invention, which is characterized in that the arrangement comprises at least one storage chamber for coffee beans or similar products, means for conveying coffee beans or similar products from the storage chamber to a supply chamber, and equipment for controlling the grinder to grind a predetermined quantity of coffee or similar products.

The primary advantage of the invention is that the quality of coffee improves, since the coffee can be vended fresh. Another advantage is significant savings in packaging material and the fact that laminates which are environmentally problematic are avoided. A further advantage is that a more realistic pricing policy for coffee can be implemented, which will make coffee trade more profitable than heretofore, and the customer will get value for his money. Furthermore, another advantage is that the introduction of novelties and special products is easier than heretofore, and thus the product selection available can advantageously be widened from the current selection.

BRIEF DESCRIPTION OF THE DRAWINGS

The following is a detailed description of the invention by means of a preferred embodiment taken in conjunction with the accompanying drawings wherein.

DETAILED DESCRIPTION OF THE PREFERRED EMBODIMENTS

Figure 1:
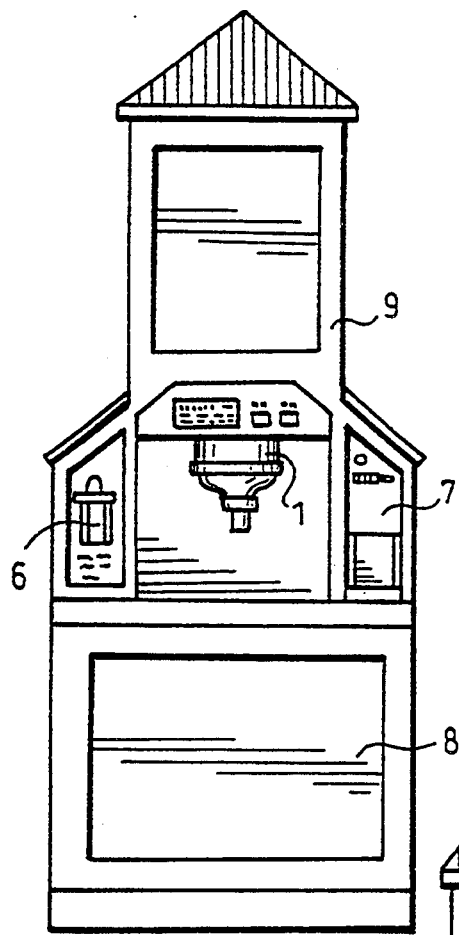
FIG. 1 is a schematic front view of an arrangement of the invention.
Figure 2:
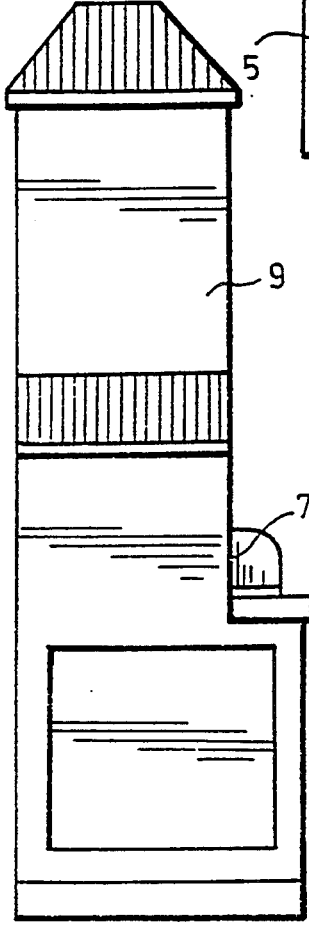
FIG. 2 is a side view of the embodiment of FIG. 1.
Figure 3:
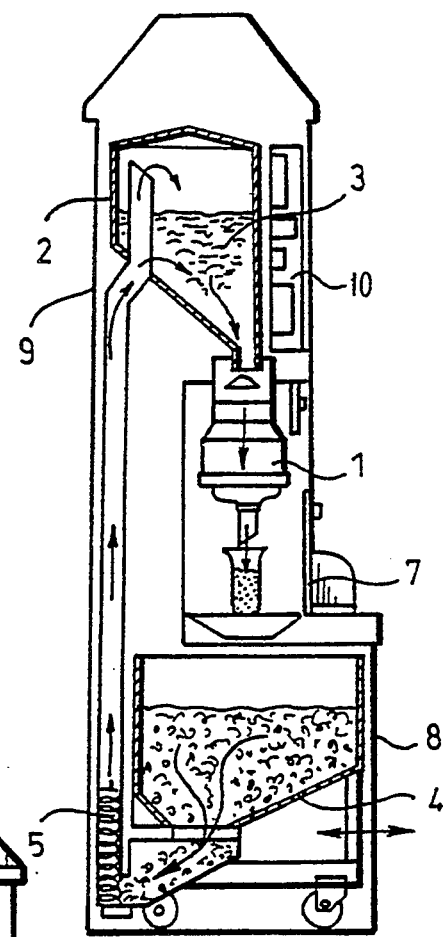
FIG. 3 is a sectional side view of the arrangement of FIGS. 1 and 2.

FIGS. 1–3 show a preferred embodiment of the arrangement of the invention. In the arrangement of the invention, a grinder is indicated at 1, and a supply chamber wherefrom coffee beans or similar products 3 are passed to the grinder 1 is indicated at 2, respectively. The grinder 1 may be of any type known in the art.

In accordance with the invention, the arrangement comprises at least one storage chamber 4 for coffee beans or similar products 3, means 5 for conveying coffee beans or similar products 3 from the storage chamber 4 to the supply chamber 2, and means for controlling the grinder 1 in such a way that it grinds only a predetermined quantity of coffee or similar products. The means wherewith the grinder 1 is controlled can comprise for instance a pre-settable time switch. The means wherewith coffee beans are conveyed from the storage chamber 4 to the supply chamber 2 can comprise for instance a screw conveyor.

The arrangement of FIGS. 1–3 operates in principle in the following way: Roasting houses deliver coffee to a shop in the form of freshly roasted beans in bags or economy-size bags. The shop has at least one arrangement as shown in the figures, comprising a storage chamber 4 for coffee beans, dimensioned according to the size of the shop, a grinder 1, and other possible accessories. The storage chamber 4 can be for instance a moving carriage located behind a door 8 that can be opened, as shown in the figures. The movements of the carriage are indicated by means of an arrow in FIG. 3. The coffee beans are passed from the storage chamber 4 to a supply chamber 2 for instance by means of a screw conveyor. The conveyance of the coffee beans 3 has been indicated by arrows in FIG. 3. The various components of the embodiment according to the figures are housed in a cabinet-like construction 9 made of plate elements.

The customer himself grinds the coffee with the grinder 1. The ground coffee runs into a bag or similar object which the customer himself has placed at the outlet of the grinder. The bag or similar object can be for instance a paper bag taken from a bag cartridge 6 mounted in the arrangement. For scales 7, which both weigh and price the ground coffee, can be disposed at the outlet of the grinder. The scales can naturally also be placed elsewhere. The grinder 1 can preferably be constructed as a device controlled by a time switch, i.e. a timer, and thus the grinder grinds a quantity of coffee pre-selected by the customer. The arrangement may for instance have two buttons, and when one of these is pressed the grinder grinds 250 g of coffee, and when the other is pressed the grinder grinds 500 g of coffee. The apparatus necessary for controlling the arrangement can be disposed for instance in an electronic unit 10. The main idea is that each customer will only grind the quantity of coffee he wants into a suitable package, and thus the freshness of the coffee can be guaranteed.

Figure 4:
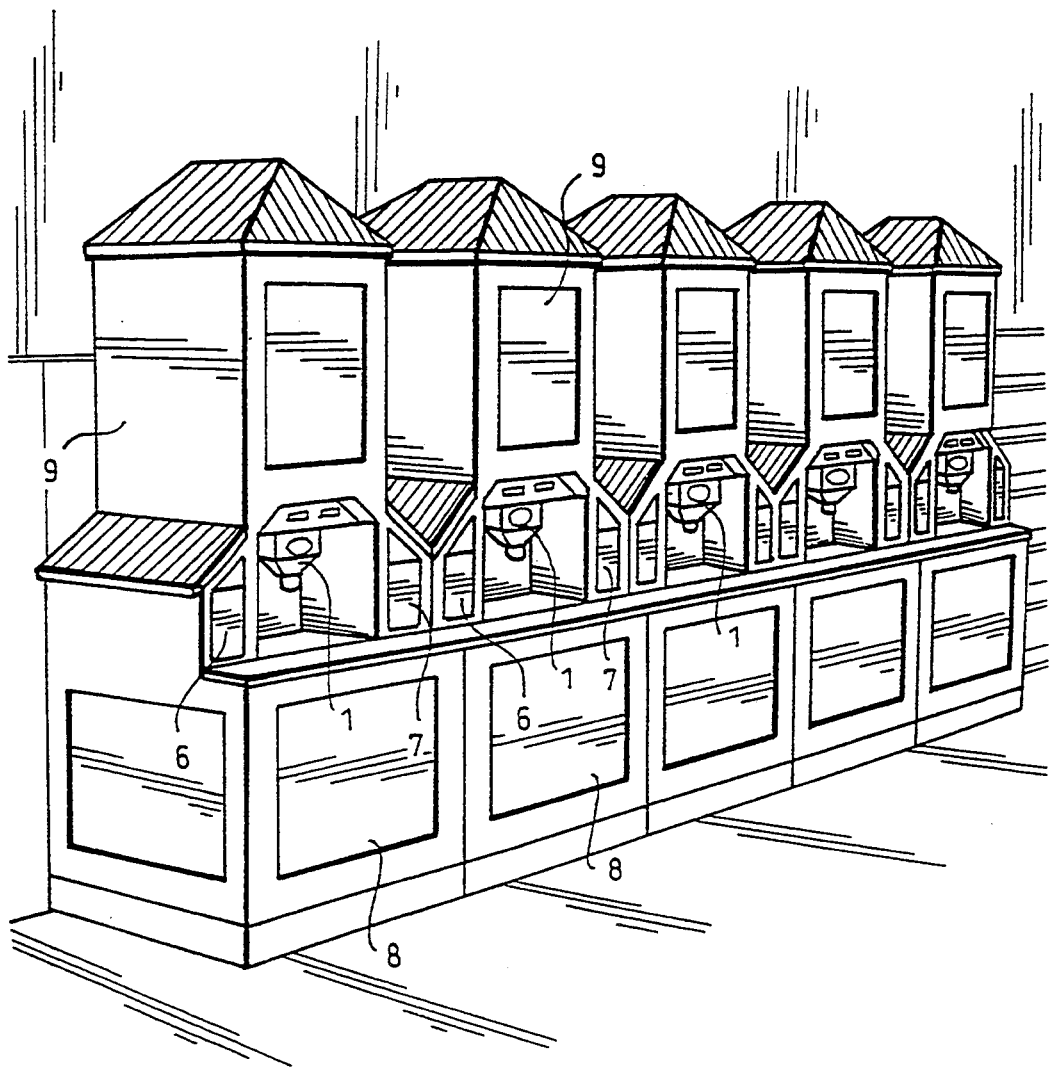
FIG. 4 is a schematic view of a preferred example of locating the arrangement of the invention in a shop.

The embodiment set out above is in no way intended to restrict the invention, but the invention can be modified fully freely within the scope of the claims. It is thus evident that the arrangement of the invention or its details need not necessarily be exactly as set forth above, but also other solutions are possible. The front of the arrangement can be shaped fully freely, and thus the appearance shown in the figures is not the only possibility. The arrangement may be shaped for instance as a large coffee package, etc. In a shop, any number of arrangements can be installed; FIG. 4 shows one example. The example of the figures employs only one storage chamber for one grinder. This is however not the only possibility, but it is possible to use for instance two, three etc. storage chambers for one grinder. The storage chamber or storage chambers can also be fitted in a different location than the grinder or grinders. The arrangement can also be constructed to be such that the customer can himself make mixtures of different coffee varieties. The arrangement can then have for example 2 to 3 storage chambers and one grinder. Different varieties of coffee are disposed in the storage chamber, and the customer can make the mixture he desires by using the automatics of the arrangement. The arrangement can e.g. have an operating button at the push of which the grinder grinds a certain quantity of a desired variety of coffee, and another corresponding button for another variety, and so on. Instead of a screw conveyor, also other suitable means can be used as the means wherewith the coffee beans or similar products are conveyed to the supply chamber; examples of such are pneumatic conveyors, paddles in an endless chain or chord, etc. The operation of said means can be controlled for example with a level sensor disposed in the supply chamber, said sensor ensuring that too many beans are not transported to the supply chamber. The ground coffee may be supplied into the customer's own tin or similar object instead of a bag. Instead of the bags provided in the arrangement that are specifically designed for this purpose, conventional bags can naturally also be used. Furthermore, the invention is in no way restricted to coffee only, but it can also be implemented in connection with other corresponding products.

I claim:

1. A device for grinding and dispensing brewable products, comprising:
   a grinder for grinding the brewable products;
   a supply chamber for supplying the brewable products to the grinder;
   a first storage chamber located below the supply chamber;
   means for conveying the brewable products from the first storage chamber up to the supply chamber; and
   control means for controlling the grinder to grind a predetermined quantity of brewable products.

2. The device of claim 1, wherein the control means includes a presettable timer.

3. The device of claim 1, wherein the conveying means comprises a screw conveyor.

4. The device of claim 2, wherein the conveying means comprises a screw conveyor.

5. The device of claim 1, wherein the supply chamber is arranged above said grinder so as to enable the brewable products to be fed by gravity from said supply chamber to said grinder.

6. The device of claim 5, wherein the storage means is located below said grinder.

7. The device of claim 1, further comprising a second storage chamber and means for mixing brewable products from the second storage chamber with brewable products from the first storage chamber.

8. A method of grinding and dispensing brewable products in a retail establishment, comprising the steps of:
   maintaining a supply of brewable products in a storage chamber;
   conveying said brewable products from said storage chamber to a supply chamber located above said storage chamber using a conveying means;
   retaining said brewable products in said supply chamber;
   feeding said brewable products from said supply chamber to a grinder;
   grinding a selected amount of brewable products at a request of a customer; and
   dispensing said ground brewable products from said grinder into a container.

9. The method of claim 8, wherein said conveying step includes using a screw conveyor to convey the coffee to the supply chamber.

10. The method of claim 8, wherein gravity feeds the coffee from the supply chamber to the grinder.

11. A device for grinding and dispensing brewable products, comprising:
    a grinder for grinding the brewable products;
    a supply chamber for supplying the brewable products to the grinder;
    a storage chamber that is removable from the device for refilling;
    means for conveying the brewable products from the storage chamber to the supply chamber; and
    control means for controlling the grinder to grind a predetermined quantity of brewable products;
    wherein the storage chamber is mounted on wheels.

12. A device for grinding and dispensing brewable products, comprising:
    a grinder for grinding the brewable products;
    a supply chamber for supplying the brewable products to the grinder;
    a storage chamber that is removable from the device for refilling;
    means for conveying the brewable products from the storage chamber to the supply chamber; and
    control means for controlling the grinder to grind a predetermined quantity of brewable products;
    wherein the conveying means comprises a screw conveyor.

13. The device of claim 12, wherein the conveying means comprises a screw conveyor.

14. A method of grinding and dispensing brewable products in a retail establishment from a device, comprising the steps of:
    maintaining a supply of brewable products in a storage chamber;
    conveying said brewable products from said storage chamber to a supply chamber using a screw conveyor;
    retaining said brewable products in said supply chamber;
    feeding said brewable products from said supply chamber to a grinder;
    grinding a selected amount of brewable products at a request of a customer;
    dispensing said ground brewable products from said grinder into a container; and
    removing said storage chamber from said device for purposes of refilling said storage chamber.

15. A device for grinding and dispensing brewable products, comprising:
    a grinder for grinding the brewable products;
    a supply chamber for supplying the brewable products to the grinder;

means for metering the amount of brewable products to be ground after the brewable products leaves the supply chamber;

a first storage chamber;

means for conveying the brewable products from the first storage chamber to the supply chamber; and control means for controlling the grinder to grind the brewable products.

16. A method of grinding and dispensing brewable products in a retail establishment, comprising the steps of:

maintaining a supply of brewable products in a storage chamber;

conveying said brewable products from said storage chamber to a supply chamber using a conveying means;

retaining said brewable products in said supply chamber;

feeding said brewable products from said supply chamber to a grinder;

metering the amount of brewable products to be dispensed after the brewable products leaves the supply chamber;

grinding the metered amount of brewable products at a request of a customer; and dispensing said ground brewable products from said grinder into a container.

17. A method of grinding and dispensing brewable products in a retail establishment from a device, comprising the steps of:

maintaining a supply of brewable products in a storage chamber that is mounted on wheels;

conveying said brewable products from said storage chamber to a supply chamber using a conveying means;

retaining said brewable products in said supply chamber;

feeding said brewable products from said supply chamber to a grinder;

grinding a selected amount of brewable products at a request of a customer;

dispensing said ground brewable products from said grinder into a container; and wheeling said storage chamber from said device for purposes of refilling said storage chamber.

* * * * *